Nov. 24, 1925.
A. ALESSI
AUTOMOBILE SIGNAL SWITCH
Filed May 28, 1923
1,562,858
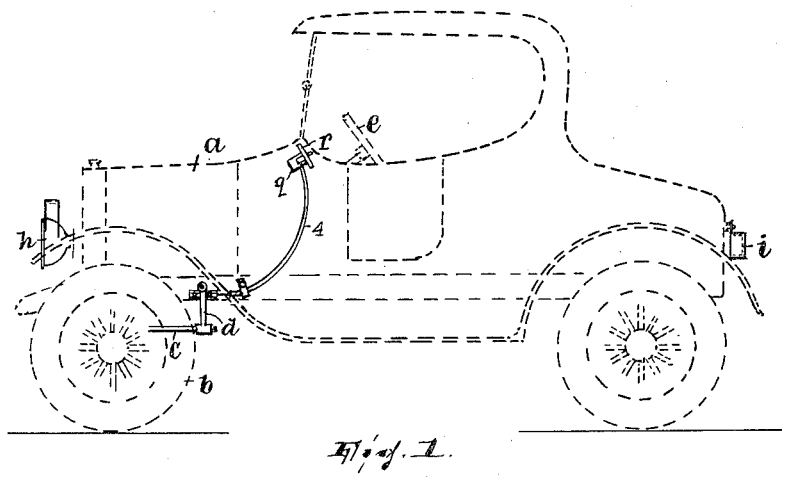
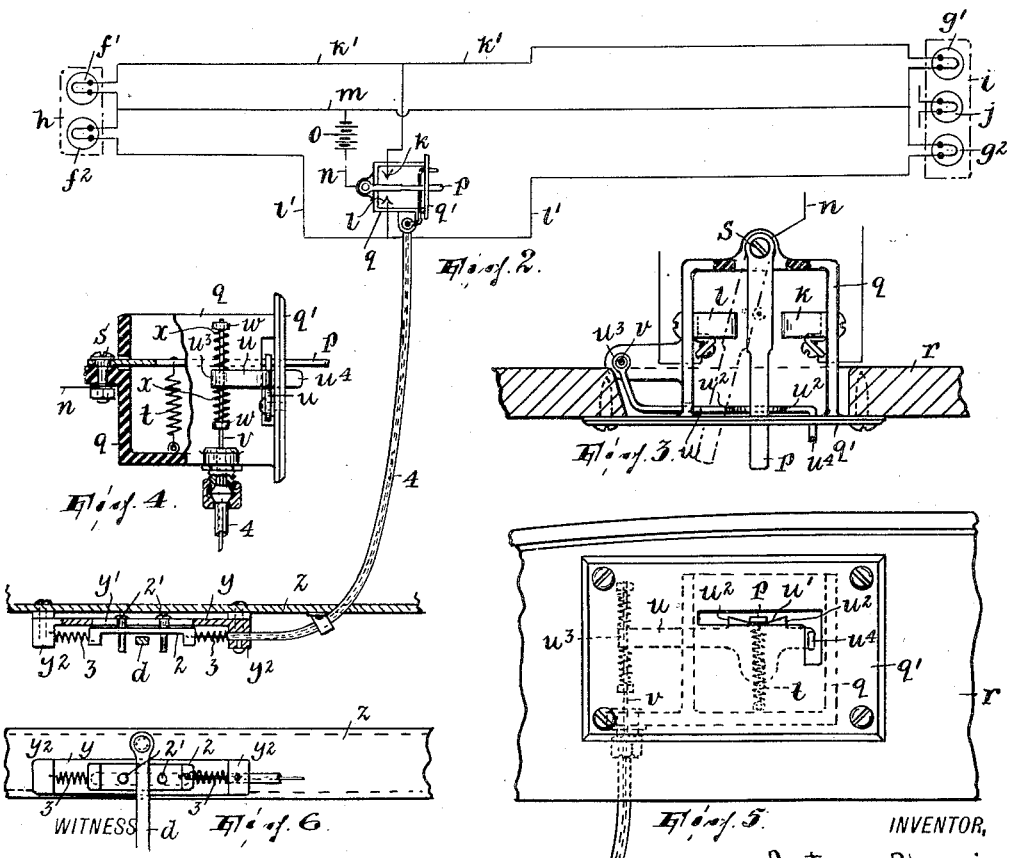

Patented Nov. 24, 1925.

1,562,858

UNITED STATES PATENT OFFICE.

ANTONY ALESSI, OF PATERSON, NEW JERSEY.

AUTOMOBILE SIGNAL SWITCH.

Application filed May 28, 1923. Serial No. 641,870.

*To all whom it may concern:*

Be it known that I, ANTONY ALESSI, a citizen of the United States, residing at Paterson, in the county of Passaic and State of New Jersey, have invented certain new and useful Improvements in Automobile Signal Switches, of which the following is a specification.

This invention has for its object to provide an automotive vehicle with means for indicating by signal that the vehicle is to change its direction of travel which shall require the simplest manipulation on the part of the occupant of the vehicle whenever said means is operated. In its best form it is intended by the invention to indicate which direction the vehicle is to take when it changes its course; but fundamentally it is only material to consider the giving of a signal regardless of the particular direction in which the vehicle's course is to be changed.

The invention consists, broadly, in providing an automotive vehicle with a movable train of parts including steering means and with signaling mechanism having signal-controlling means manually movable to a position of rest for setting the signal, said controlling means when in said position being controlled as to its movement therefrom by said train. In that adaptation of the invention herein set forth the controlling means is normally held in a given position (where the signal is idle or not set) and when manually moved to the position of rest for setting the signal is retained in that position by means also included in said train, so that when the said train is moved in order to change the direction of travel of the vehicle said controlling means is released and resumes the position in which it is normally held. In the present adaptation, moreover, the arrangement is such that differentiating signals are operative, so that the direction (as right or left) which the vehicle is to take may be indicated.

In the drawings,

Fig. 1 shows one form of the invention in side elevation in place on a vehicle, which is shown dotted, the electric circuit of the signaling system being omitted;

Fig. 2 is a plan of the mechanism of the invention, partly in section, the circuit and signals appearing diagrammatically;

Fig. 3 is a horizontal sectional view of the instrument-board of the vehicle, showing in plan, partly in section, the portion of the mechanism which is carried by the instrument-board;

Fig. 4 is a side elevation, partly in section, of said portion of the mechanism;

Fig. 5 is an elevation of what is shown in Fig. 3;

Fig. 6 shows that part of the mechanism with which the steering means is directly associated.

$a$ designates an automotive vehicle whose front wheels $b$ are pivoted to turn on vertical axes for the purpose of steering the vehicle and which have connected with them, thus to afford the steering means of the vehicle, the reach-rod $c$, itself suitably connected to the steering arm $d$ fulcrumed in the vehicle chassis and adapted to be turned forward or back by turning one way or the other the steering wheel $e$. The manner of mounting the wheels $b$ to turn as stated, and the connections between the reach-rod and said wheels and between the steering arm and steering wheel are not shown because they are all well known; for the present purposes it will suffice to let the part $d$ stand for a portion of the steering means of the vehicle.

Let $f'$ $f^2$ denote signals at the front of the vehicle and $g'$ $g^2$ signals at the rear thereof. These signals are all in the example shown electric incandescent lamps. Any expedient whereby the signals $f'$ and $f^2$ (or $g'$ and $g^2$) will serve when operated to indicate that the vehicle is to change its course to right or left may be adopted, as by placing one at the right and the other at the left; in the present case, the signals $f'$ and $f^2$ have been incorporated with the right and left head-lights $h$ of the vehicle and the signals $g'$ and $g^2$ placed in a case $i$ at the right and left thereof ($j$ being the usual tail-light placed between them). There are two circuits shown, one having the terminal $k$ and two branches $k'$ respectively containing the lamps $f'$ $g'$ and the other having the terminal $l$ and two branches $l'$ respectively containing lamps $f^2$ $g^2$ (the lamps $f'$ $g'$ on the one hand and the lamps $f^2$ $g^2$ on the other being thus in parallel) and both circuits being completed by a common conductor $m$ having a lead $n$ containing a source of energy $o$ and terminating in a circuit-closer $p$ between the terminals $k$ $l$, which are spaced.

The lamps $f'$ $g'$ or $f^2$ $g^2$ will be energized according as the circuit-closer is moved into contact with either $k$ or $l$.

A box or case $q$, preferably of insulating material and having a frontal cover $q'$, is arranged on the instrument-board $r$ of the vehicle. Circuit-closer $p$ is here a lever movable horizontally in this case $q$ on a pivot $s$ and protruding through its cover $q'$. The terminals $k$ $l$ are metal clips secured in the case $q$ so that when the lever $p$ is moved to right or left it wipes over and upon one of them. The lever is normally held in the intermediate position, out of contact with each terminal, by a spring $t$.

Pivoted in the box or case $q$ to move in a vertical plane is a latch $u$ which has a V-shaped crotch $u'$ flanked on each side by a shoulder $u^2$. One end of this latch or lever has an eye $u^3$ penetrated by the upper end of a thin rod or wire $v$ having collars $w$ fixed thereon above and below the latch and a spring $x$ interposed between each collar and the latch. The wire (as will appear) is normally held in the position of Fig. 4, so that if the circuit-closer is moved to right or left it depresses the latch which is immediately returned by the one of the springs $x$ that has been compressed and serves as a detent to hold the circuit-closer in its new or abnormal position—closing one of the circuits.

A bracket $y$ is secured to the chassis $z$ of the vehicle beside the steering arm $d$. It has a horizontal slot $y'$ receiving headed pins $2'$ of a slide 2 which it thus guides horizontally. This slide is held in the mid-position between two lugs $y^2$ on the bracket by a pair of opposed springs 3, and its pins receive between them, with slight play, the steering arm $d$. The springs 3 are stronger than springs $x$ and thus oppose resistance to the movement of the slide and the wire when the latch is depressed by sidewise movement of the circuit-closer. (The springs $x$ might be dispensed with, and only the springs 3 used, except that the slide and wire should be held fairly firmly in order to avoid lost motion and displacement thereof incident to jar and vibration, and with the springs 3 strong enough for that purpose the lever $p$ could not be moved by hand with sufficient ease.)

The operation is as follows: The element $p$ here represents the aforementioned signal-controlling means manually movable to a position of rest ($k$ or $l$) for setting the signal, while $d$—$y$—$v$—$x$—$u$ represent the aforementioned movable train of parts including the steering means ($d$); there is slight lost-motion between $d$ and $y$ on account of the spacing (Fig. 2) of the pins $2'$—which is to allow for a little free shifting of the steering means, as in the vehicle making inappreciable turns—but this is obviously immaterial and the operation would be essentially the same without it. The driver, when a turn is about to be made, shifts the lever $p$ to one of the signal-setting positions—in contact with $k$ or $l$. The signal being thus set, when the movable train is moved in the act of steering the latch $u$, moved from arm $d$ through parts $y$, $v$, $x$, is tilted, releasing the lever $p$, which assumes its normal position, the signal being extinguished. The latch has a projecting lug $u^4$ whereby, should the operator set a signal and then not cause the vehicle to change its course as at first intended, the latch may be manually moved to releasing position.

Where, as herein shown, the two forward or rearward signals are placed close together, as on a head-light $h$ or in the case $i$, they may be differently colored.

Having thus fully described my invention, what I claim as new and desire to secure by Letters Patent is:—

1. In a vehicle signal control, the combination of a steering mechanism having a yieldable means connected thereto, a switch including a stationary contact, a movable contact, and a means for manually moving said contacts into operative engagement, and a latch means for retaining said contacts in operative engagement, said yieldable means being in constant engagement with said latch means and adapted to release said latch means when the steering mechanism is moved.

2. In a vehicle signal control, the combination of a steering mechanism having a yieldable means connected thereto, a switch including a plurality of stationary contacts, a movable contact, and a means for manually moving said contacts into operative engagement selectively, and a latch means for retaining said contacts in operative engagement, said yieldable means being in constant engagement with said latch means and adapted to release said latch means when the steering mechanism is moved.

In testimony whereof I affix my signature.

ANTONY ALESSI.